FREQUENCY MODULATION SYSTEM

Filed May 26, 1960 3 Sheets-Sheet 1

Inventors
A. GIRINSKY
P.C.A. BACOT
By E. H. Suydam
AGENT

Inventors
A. GIRINSKY
P.C.A. BACOT
By C. H. Suydam
AGENT

Aug. 28, 1962 A. GIRINSKY ET AL 3,051,786

FREQUENCY MODULATION SYSTEM

Filed May 26, 1960 3 Sheets-Sheet 3

Inventors
A. GIRINSKY
P.C.A. BACOT
By C. H. Suydam
AGENT

United States Patent Office 3,051,786
Patented Aug. 28, 1962

3,051,786
FREQUENCY MODULATION SYSTEM

Anatole Girinsky, Boulogne, Seine, and Pierre Charles Augustin Bacot, Creteil, France, assignors to International Standard Electric Corporation, New York, N.Y., a corporation of Delaware Filed May 26, 1960, Ser. No. 31,980
Claims priority, application France June 19, 1959
8 Claims. (Cl. 178—66)

Figure 1:
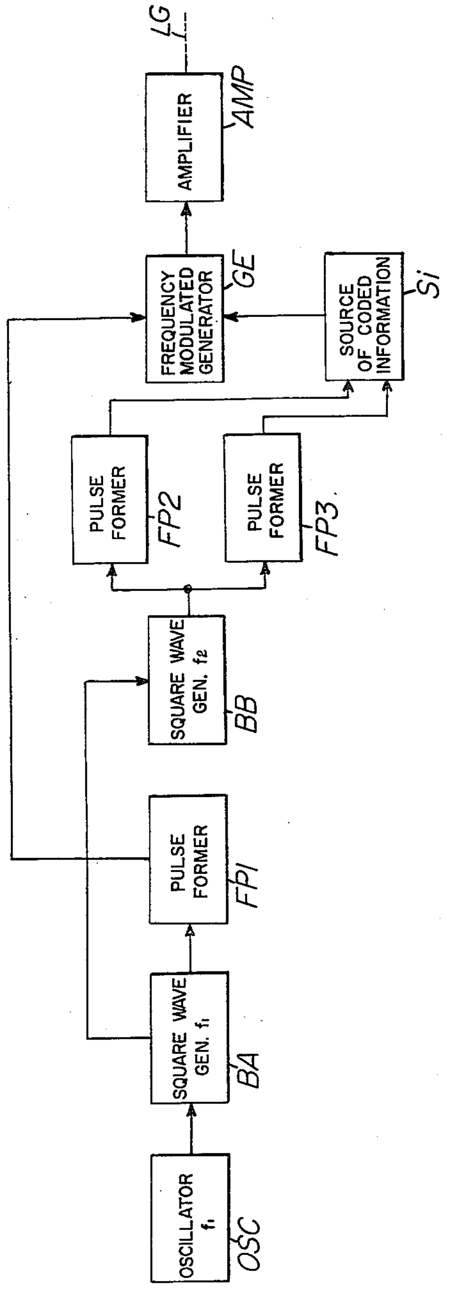

This invention relates to a frequency modulation system particularly adapted for high-speed telegraph and data transmission. In particular it relates to a method for maintaining synchronization and distinguishing between mark and space signals in such a system in which the mark signals are transmitted by waves of one frequency and the space signals are transmitted by waves of a different frequency.

French Patent No. 1,181,437, describes a coded transmission system in which synchronization signals are supplied simultaneously with the sending of each code element, each element being characterized at its beginning by a reversal of polarity. Thus, two successively transmitted code elements necessarily results in two consecutive signals of different polarity. It is then no longer possible to differentiate between a mark and space element by assigning them a polarity. The discrimination between mark and space signals is achieved by introducing a reversal of polarity in the middle of one of the elements, e.g., the mark or the space.

In the present invention there is no reversal of polarity during a pulse period and synchronization is accomplished by pulsing the carrier wave only during periods when the voltage of the carrier wave is zero. The frequency of the carrier wave is not changed at this time. However, there is a change in frequency (rather than a change in polarity) between consecutive code elements even though they may be both mark or both space signals and it is not possible to distinguish between the signal elements by assigning them a frequency. Discrimination between the mark and space signals is achieved by introducing a change in frequency in the middle of the time duration of one of the signals. The frequency change is made at the time of zero stored energy in the oscillatory circuit. If a frequency change is made by varying the capacitance of the circuit, the time of frequency change is when the voltage across the capacitance is zero. If the frequency change is made by varying the inductive reactance of the circuit the time of zero energy is when the current is zero.

Hereinafter the "time duration" of a signal element, whether it be a mark or a space signal, will be referred to as a "moment."

According to one feature of the invention, a frequency modulation system for high speed data transmission is provided in which the value of one of the reactive elements of a tuned circuit for determining the generated frequency is changed when the accumulated energy is equal to zero in such element, thereby changing the frequency from one value to another with small transient phenomena.

According to another feature of the invention, the signal frequency is modulated by changing the inductance of a tuned circuit when the voltage of the transmitted signal is either a maximum or a minimum, the current through said inductance, and therefore the accumulated energy, being then equal to zero.

According to another embodiment of the invention, another feature lies in the fact that the frequency is modulated by acting on a capacitor of the tuned circuit when the voltage of the transmitted signal is equal to zero, the energy therein being then equal to zero.

According to another feature of the invention, there is provided a timing circuit from which two trains of sharp pulses are supplied, the one for synchronizing the transmitted signal, the other for controlling the information source, in such a way that the changes of frequency only occur for a determined phase of the transmitted signal (maximum, minimum or zero).

According to another feature of the invention, there is provided a square wave generator, from which waves, after being differentiated, there is obtained a first train of sharp pulses for cyclically controlling the synchronization of the transmitted signal, said generator controlling, at its turn, a second generator which also supplied square waves at a repetition rate one-half that of the first generator. From the waves of the second generator there are obtained a second and a third train of pulses, each pulse of the second train marking the beginning of a transmitted moment and each pulse of the third train marking the middle of a transmitted moment. All these sharp pulses and the transmitted signal frequencies are determined in such a way that the changes of frequency corresponding to the beginning and the middle of a moment occur at the maximum, the minimum or a "zero" of the transmitted signal.

Another feature of the invention lies in the fact that each sharp pulse of the first train determines some diodes to conduct, that short-circuiting the oscillator of the frequency modulated generator and thus controlling the synchronization of said generator.

Another feature of the invention lies in the fact that each change of polarity in a determined sense of the information source determines some diodes to conduct, that short-circuiting an additional part of the inductance in the frequency modulated generator and thus providing the wanted modulation.

Figure 2:
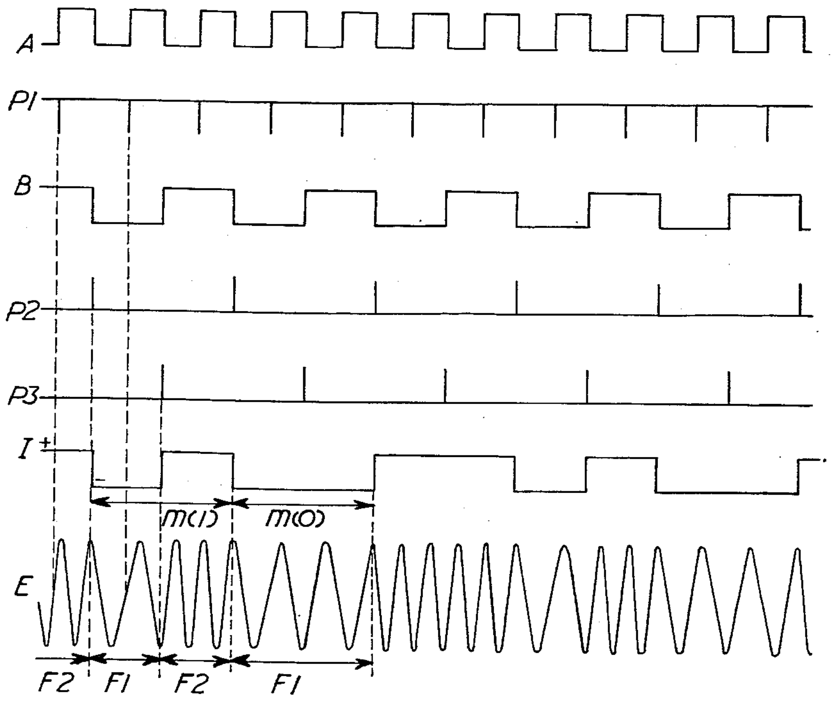
Figure 3:
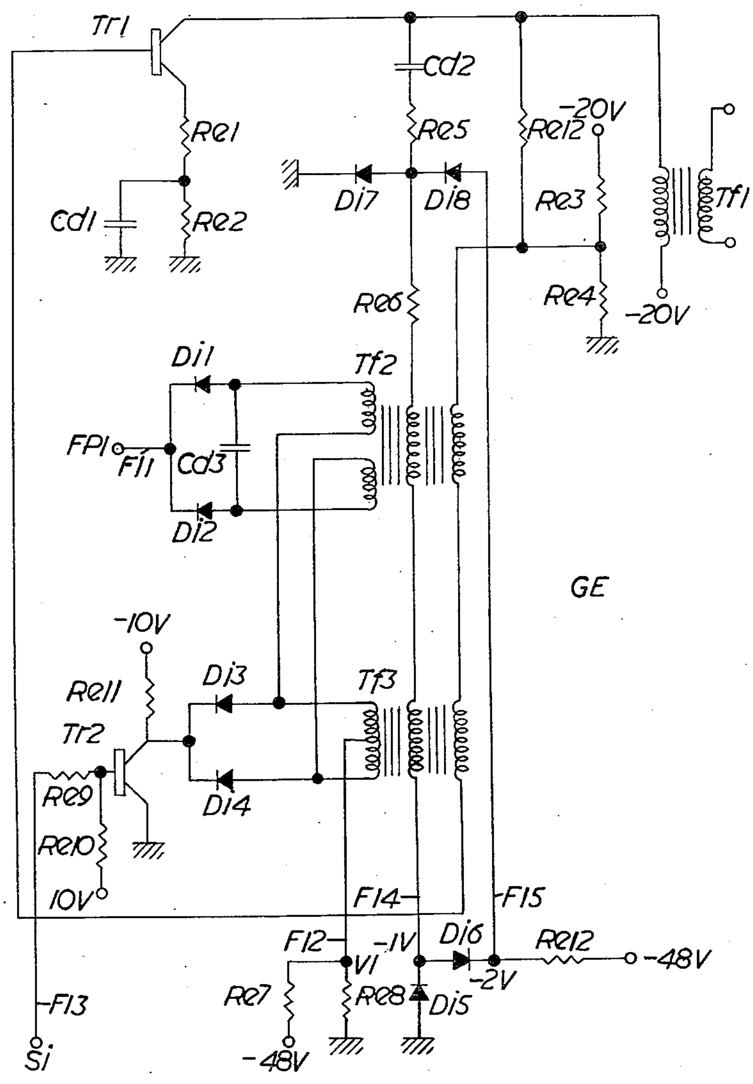

Different other features will appear from the following description, given as a non-limitative example, with reference to the accompanying drawings in which:

FIGURE 1 is a junction diagram for explaining the general operation of the system, FIGURE 2 is a set of curves for a better understanding of the diagram shown in FIGURE 1, and FIGURE 3 is an embodiment of the frequency modulated generator.

The general operation of the system will be described now with reference to FIGURES 1 and 2. The oscillator OSC supplies a sinusoidal current having a constant frequency $f_1$. This oscillator acts on a trigger BA which supplies square wave signal at the same frequency $f_1$ as shown in FIGURE 2, A. Trigger BA controls, at its turn, a second trigger BB which supplies square wave signals having a frequency $f_2$, equal to one-half the frequency $f_1$, as shown in FIGURE 2, B. From signals B there are obtained two trains of sharp pulses, P2 and P3, by means of pulse formers FP2 and FP3. From signals A there are obtained sharp pulses P1 by means of a pulse former FP1.

The binary elements of information are transmitted from the source *Si*, in a coded form. These coded pulses of information may be generated according to any known process such as described in the French Patent No. 1,181,437. A moment *m* of a constant length is assigned to the transmission of each binary element (see curve I, FIGURE 2). If the transmitted element is "1," the polarity of the current, when coded, is reversed at the middle of the moment; if "0," the polarity remains the same during the whole moment; furthermore, the polarity is automatically reversed at the beginning of each moment whether the element is either a "1" or a "0," for synchronizing purposes. As it may be shown in FIGURE 2, the changes of polarity of the information source are controlled by sharp pulses P2 and P3; pulses P2, which mark the beginning of a moment, each time control a change of polarity. On the contrary, pulses P3 mark the middle of a moment and control a change of polarity only if a "1" must be transmitted.

As shown in FIGURE 1, the information source S*i* controls the output signal supplied by generator GE to be frequency modulated, the transmitted frequency being F2 for the positive polarities of the information source and F1 for the negative polarities (curve E, FIGURE 2).

The operation of the frequency modulated generator GE depends on sharp synchronizing pulses P1. Each sharp pulse P1, of which the duration is only some microseconds, blocks generator GE which can only be restarted at the end of the pulse P1; in such conditions, each sharp pulse P1 appears when voltage E crosses the "zero," as shown in FIGURE 2 by the dotted lines.

The frequency signals F1 and F2 transmitted by generator GE are determined in such a way that an odd number of ¼ cycles of E be comprised between each sharp pulse P1 and the pulse P2 or P3 which immediately follows. Thus, in the example shown, there are 5 ¼ cycles of E between the first pulse P1 and the pulse P2. In such conditions, the beginning of each moment *m* corresponding to the transmission of an element "1" occurs when voltage E is at a maximum. At this time, the current flowing through the inductance of the oscillator in generator GE is equal to zero; the stored energy in said inductance is also equal to zero. According to the invention, it is then possible to insert an additional inductance for changing from frequency F2 to frequency F1, thus reducing spurious transient phenomena.

As there is an odd number of ¼ cycles of voltage E between the first pulse P1 and the pulse P2 which immediately follows, an even number of ¼ cycles will be obviously found between the first and the second pulse P1, that corresponding to an integer of ½ cycle. Therefore, the second pulse P1 must be, in principle, supplied when voltage E crosses a "zero"; in all cases, the pulse P1 controls the blocking of generator GE which can be restarted only after it has elapsed, the synchronization between generator GE and the pulses P1 being maintained in a strict manner.

The operation is the same for each pulse P1 and pulse P2 which immediately follows, in such a way that each change of frequency always occurs when the voltage of the transmitted signal E is either minimum or maximum, thus reducing spurious transient phenomena.

According to another embodiment, the change of frequency from F2 to F1 may be controlled by inserting an additional capacitor in the oscillator. In this case, it is necessary to control the switching when the stored energy in the capacitor is equal to zero, i.e. when voltage E crosses the "zero." In this case also, pulses P1, P2, P3 must be determined in such a way that an integer of ½ cycle of E be comprised between each pulse P1 and the pulse P2 or P3 which immediately follows.

The signal E is then amplified by means of the power amplifier AMP and transmitted on line LG.

An embodiment of the frequency modulated generator GE will be now described, with reference to FIGURE 3. The information source S*i* has been described in the French Patent No. 1,181,437. The other apparatus shown in the schematic form on the diagram FIGURE 1 are well known and will not be described.

The collector of transistor T*r*1, type P-N-P is connected to a voltage −20 v. through the primary winding of the output transformer T*f*1; the emitter is grounded through resistors R*e*1, R*e*2, its base electrode being biased in a convenient manner by means of a voltage divider provided with resistors R*e*3, R*e*4. C*d*1 is a decoupling capacitor. The collector of the transistor T*r*1 is connected to an oscillator through capacitor C*d*2, resistors R*e*5, R*e*6 and transformer T*f*2; this oscillator is constituted as follows: capacitor C*d*3, upper lefthand winding of transformer T*f*2, lefthand winding of transformer T*f*3, lower lefthand winding of transformer T*f*2. The two windings of transformer T*f*2 provide the main part of the inductance of this oscillator; the winding of transformer T*f*3 is the additional part which may be either inserted or removed at will for changing from frequency F1 to frequency F2 or the contrary. This oscillator is coupled to the base electrode of T*r*1 through transformers T*f*2 and T*f*3, in such a way that the transistor T*r*1 operates normally as an oscillator.

In the absence of pulses P1, wire F11 is nearly at the potential of the ground. As wire F12 is at a potential V1 slightly lower than that of the ground, by a suitable choice of resistors R*e*7, R*e*8, diodes D*i*1, D*i*2 are blocked and the oscillator operates. When a negative pulse P1 is received wire F11 becomes negative and the two following circuits are completed: (*a*) wire F11, diode D*i*1, upper lefthand winding of transformer T*f*2, upper part of lefthand winding of transformer T*f*3, wire F12; (*b*) wire F11, diode D*i*2, lower lefthand winding of transformer T*f*2, lower part of the lefthand winding of transformer T*f*3, wire F12. Diodes D*i*1, D*i*2 now conduct: it follows that the oscillator is short-circuited and generator GE marks a pause. When P1 has elapsed, diodes D*i*1, D*i*2 are again blocked and the generator restarts at the beginning of a cycle, as shown in FIGURE 2.

The information source S*i* which controls the modulation of the signal supplied by the generator is connected to the base electrode of transistor T*r*2, through wire F13 and resistor R*e*9. When this source supplies a negative signal—which is the case for the first part of the transmitted moment corresponding to "1" (FIGURE 2)—transistor T*r*2 conducts; due to the drop of voltage across resistor R*e*11, the potential of its collector is nearly the same as that of the ground; no current is flowing from said collector to wire F12. The two diodes D*i*3, D*i*4 are blocked; the additional inductance of the oscillator constituted by the lefthand winding of transformer T*f*3 is inserted, that corresponding to frequency F1. On the other hand, when the information source supplies a positive signal—which is the case for the second part of the moment—transistor T*r*2 is blocked; its collector is at a potential −10 v. and the two following circuits are completed: (*a*) collector of transistor T*r*2, diode D*i*3, upper part of the lefthand winding of transformer T*f*3, wire F12 at the potential V1; (*b*) collector of transistor T*r*2, diode D*i*4, lower part of T*f*3 transformer lefthand winding, F12. It follows that the diodes D*i*3, D*i*4 conduct, the lefthand winding of transformer T*f*3 being short-circuited. The additional part of the oscillator inductance being removed, said oscillator supplies frequency F2.

Resistor R*e*10, connected to potential +10 v., provides a potentiometer with resistor R*e*9, that allowing to strictly determine the bias voltages for transistor T*r*2; in fact, the positive signal supplied by S*i* corresponds nearly to 0 v. and transistor T*r*2 may not be blocked if the potentiometer constituted with R*e*9 and R*e*10 is not provided.

Diodes D*i*5, D*i*6 and resistor R*e*12 form a potentiometer; in the beforegoing, it has been assumed that these elements are determined in such a way that wires F14 and F15 are respectively at potentials −1 v. and −2 v. The potential −1 v. applied to the lower terminal of the middle winding of transformer T*f*3 corresponds nearly to the mean value of the signal at the junction point of diodes D*i*7, D*i*8. Furthermore, said signal remains between 0 v. and −2 v.; when it reaches one of these limits, one of the diodes D*i*7 or D*i*8 conducts and transformers T*f*2 and T*f*3 are short-circuited. The signal obtained is thus relatively stable, even if the transistors which are used have characteristics and bias voltages varying in large limits. At the junction point of diodes D*i*7, D*i*8, the signal is then appreciably clamped, but a sinusoidal signal is however found at the output of transformer T*f*1.

Resistor R*e*12 corresponds to a reactive circuit for stabilizing the operation of generator GE.

Finally, the frequency modulated signal is supplied at the output of the secondary winding of transformer TF1; it is then amplified as previously mentioned.

It is understood that the beforegoing has been given only as non-limitative example and that various embodiments may be realized without departing from the scope of the invention. Other code systems may be used for the transmission of the information; a number of circuits may be modified in generator GE; in particular, the transistors may be replaced by electronic tubes and the diodes which act on the oscillator by any other switching device. All the numerical indications, which essentially depend on the operation data and are liable to vary with each particular case, have been mentioned as examples, in order to make clear the understanding.

What is claimed is:

1. A pulse code frequency modulation system comprising: a generator of carrier waves; and signal means connected to said generator for modulating said carrier waves including a source of binary code elements each having one of two conditions, means for changing the frequency of said carrier waves at the beginning of every code element and means for also changing the frequency of said carrier waves in the middle of only those code elements having a given one of said two conditions.

2. A pulse code frequency modulation system according to claim 1 wherein said generator of carrier waves comprises an oscillatory circuit including a reactor and means connected to said reactor for changing the frequency of said carrier waves when the stored energy in said reactor is zero.

3. A pulse code frequency modulation system according to claim 2 wherein said reactor comprises an inductor.

4. A pulse code frequency modulation system according to claim 2 further comprising: a timing means having a constant frequency and pulsing means connected between said timing means and said carrier wave generator for periodically synchronizing said generator by said constant frequency.

5. A pulse code frequency modulation system according to claim 4 wherein the time period between the pulses of said pulsing means is equal to an odd multiple of one-quarter cycles of said carrier waves.

6. A pulse code frequency modulation system comprising: a signal source for producing binary code elements, each having one of two conditions, said elements having equal moments; a first pulse former for generating a first train of synchronizing pulses; a second pulse former connected to said signal source for generating a second train of pulses to determine the beginning of said moments; a third pulse former connected to said signal source for generating a third train of pulses to determine the middle of said moments; a timing generator; circuit means connecting said timing generator to said first, second and third pulse formers for controlling the pulse repetition rates of the pulses of said first, second and third pulse trains respectively such that the pulse repetition rate of the first pulse train is equal to the frequency of said timing generator, the pulse repetition rate of said second pulse train is equal to one-half the rate of, and the pulses thereof lie midway between, the pulses of said first pulse train, and the pulse repetition rate of said third pulse train is equal to that of said second pulse train and the pulses thereof lie midway between the pulses of said second pulse train; a source of carrier waves, said source comprising a reactor; means for applying the pulses of said first pulse train to said source of carrier waves to synchronize said carrier waves at their zero crossing; means for applying the pulses of said second pulse train to said source of carrier waves to change the frequency thereof at the beginning of the moments of all of said binary elements when the energy stored in said reactor is substantially zero; and means for applying the pulses of said third pulse train to said source of carrier waves to change the frequency thereof at the middle of the moments of only those code elements having a given one of said two conditions.

7. A pulse code frequency modulating system according to claim 6 wherein said reactor comprises an inductor.

8. A pulse code frequency modulation system according to claim 6 wherein said circuit connecting means comprises: a first wave generator developing a square wave having the same frequency as said timing generator; a second wave generator connected to said first wave generator for developing a square wave having a frequency one-half that of said first wave generator; said first wave generator being connected to said first pulse former and second wave generator being connected to said second and third pulse formers.

References Cited in the file of this patent

UNITED STATES PATENTS

| | | |
|---|---|---|
| 2,678,997 | Darlington | May 18, 1954 |
| 2,729,809 | Hester | Jan. 3, 1956 |
| 2,947,814 | Haner | Aug. 2, 1960 |